(12) United States Patent
Kuwabara

(10) Patent No.: US 9,538,444 B2
(45) Date of Patent: Jan. 3, 2017

(54) ACCESS POINT, WIRELESS COMMUNICATION TERMINAL AND SERVER

(75) Inventor: Megumi Kuwabara, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 312 days.

(21) Appl. No.: 13/121,136

(22) PCT Filed: Sep. 25, 2009

(86) PCT No.: PCT/JP2009/066688
§ 371 (c)(1),
(2), (4) Date: Mar. 25, 2011

(87) PCT Pub. No.: WO2010/035805
PCT Pub. Date: Apr. 1, 2010

(65) Prior Publication Data
US 2011/0176417 A1 Jul. 21, 2011

(30) Foreign Application Priority Data
Sep. 26, 2008 (JP) .................................. 2008-248517

(51) Int. Cl.
*H04W 36/22* (2009.01)

(52) U.S. Cl.
CPC .................................... *H04W 36/22* (2013.01)

(58) Field of Classification Search
CPC .............................. H04L 47/14; H04L 47/122
(Continued)

(56) References Cited

U.S. PATENT DOCUMENTS 6,871,071 B2   3/2005   Takao et al.
8,160,638 B2*  4/2012   Salowey ................. 455/552.1
(Continued)

FOREIGN PATENT DOCUMENTS

JP   2001-251658 A   9/2001
JP   2002-158697 A   5/2002
(Continued)

OTHER PUBLICATIONS

Final Office Action dated Feb. 7, 2013, issued in counterpart Korean Application No. 10-2011-7006834.
(Continued)

*Primary Examiner* — Hassan Kizou
*Assistant Examiner* — Ashil Farahmand
(74) *Attorney, Agent, or Firm* — Procopio Cory Hargreaves and Savitch LLP

(57) ABSTRACT

Provided is an access point capable of handling a connection request exceeding the throughput while maintaining a communication state of a wireless communication terminal. The access point has a notification unit 212 for notifying the server 11 of a bandwidth deficit if, in response to a connection request including a required bandwidth received from a wireless communication terminal 31, the required bandwidth cannot be secured, and a request unit 211, based on information on a specific wireless communication terminal 32 capable of changing an access point transmitted from the server 11 in response to a notification by the notification unit 212, for requesting the specific wireless communication terminal 32 to change the wireless IF being used.

11 Claims, 15 Drawing Sheets

(58) Field of Classification Search
USPC ....... 370/230, 237, 310–350; 455/422.1–461
See application file for complete search history.

(56) References Cited

U.S. PATENT DOCUMENTS

| | | | |
|---|---|---|---|
| 2002/0160777 A1* | 10/2002 | Takao et al. | 455/436 |
| 2004/0192284 A1* | 9/2004 | Vaisanen | H04W 48/12 |
| | | | 455/422.1 |
| 2005/0089064 A1* | 4/2005 | Zimmerman et al. | 370/468 |
| 2005/0147065 A1* | 7/2005 | Iguchi et al. | 370/335 |
| 2006/0121901 A1 | 6/2006 | Tanaka et al. | |
| 2006/0268767 A1* | 11/2006 | Sato et al. | 370/328 |
| 2009/0005045 A1 | 1/2009 | Kuriki et al. | |

FOREIGN PATENT DOCUMENTS

| | | |
|---|---|---|
| JP | 2005-159929 A | 6/2005 |
| JP | 2008-211359 A | 9/2008 |
| KR | 10-2001-0113715 | 12/2001 |
| WO | 01/49059 A1 | 7/2001 |
| WO | 2005/025253 A1 | 3/2005 |
| WO | 2007/129479 A1 | 11/2007 |

OTHER PUBLICATIONS

International Search Report dated Oct. 27, 2009 issued by the Japanese Patent Office for International Application No. PCT/JP2009/066688.
Office Action dated Apr. 24, 2012, issued in counterpart Japanese Patent Application No. 2010-530879.
Office Action dated Jul. 30, 2012, issued in counterpart Korean Application No. 10-2011-7006834.

\* cited by examiner

ACCESS POINT, WIRELESS COMMUNICATION TERMINAL AND SERVER

CROSS REFERENCE TO RELATED APPLICATION

This application claims priority to and the benefit of Japanese Patent Application No. 2008-248517 filed on Sep. 26, 2008, the entire contents of which are incorporated herein by reference.

TECHNICAL FIELD

The present invention relates to an access point, a wireless communication terminal and a server that constitute a wireless communication system.

BACKGROUND ART

The wireless communication system has been developed in a variety of manners in recent years. As for a service, for example, browse of websites and VoIP (Voice over IP) may be included. In addition, as for a hardware, multimode terminals have been popularly used, which have a plurality of wireless interfaces (hereinafter, an interface is appropriately abbreviated to an IF) corresponding to different wireless communication networks such as, for example, a combination of a CDMA (Code Division Multiple Access) network and a wireless LAN (Local Area Network).

On the other hand, the wireless communication system, for normal connection services except for a leased circuit connection service, generally employs a best effort type. The best effort type is a type of a communication system which does not guarantee quality of service although making an effort to maintain a good communication service. For example, if there are only a small number of wireless communication terminals connecting to an access point (hereinafter, appropriately abbreviated to AP) which is a base station, a sufficient bandwidth is assigned to each wireless communication terminal. However, the more the wireless communication terminals connect to the AP, the narrower bandwidth is assigned to each wireless communication terminal, which makes a communication speed slowed down. Additionally, if a communication amount reaches the trunk capacity of the AP, the wireless communication system rejects a connection of a new wireless communication terminal.

Accordingly, it is concerned for the communication system of the best effort type that, in proportion to the increase in users in the recent years, the bandwidth assignable to each wireless communication terminal becomes narrower and thus it is often occurred that the communication speed slows down or connection is rejected.

In order to solve such problems, there is known a communication system which, for example, prioritizes wireless communication terminals in order to control connections based on the priority (For example, see Patent Document 1). In this communication system, if a connection exceeding throughput is requested, a gatekeeper refers to the priorities of the wireless communication terminals in communication and the priority of the wireless communication terminal requesting the connection and, within a range maintaining a total communication amount equal to or less than the throughput, sequentially selects wireless communication terminals with higher priorities to perform communications. Then, it is controlled such that the wireless communication terminals selected connect in a conventional manner, whereas wireless communication terminals unselected search for indirect routes to find another access point. Accordingly, the wireless communication terminals with higher priorities can achieve a bandwidth requested by a user. In addition, if there is an indirect route, more wireless communication terminals than ever before can perform communication.

In addition, there is known another wireless communication system for controlling connections of multimode terminals having a plurality of wireless IFs, which selects another wireless IF to make the wireless communication terminal perform handoff when a communication environment of the wireless IF used by the wireless communication terminal is deteriorated (for example, see Patent Document 1). In this wireless communication system, the server selects a wireless IF which can be used by the wireless communication terminal based on terminal management information and network management information in response to a request for handoff from the wireless communication terminal, and notifies the wireless communication terminal of the wireless IF. Thereby, the wireless communication terminal performs control for handoff to the wireless IF in such notification. Therefore, according to this wireless communication system, if wireless communication terminals in the network performs handoff actively, the number of terminals connected to one AP is reduced, which increases the possibility that each wireless communication terminal can obtain a desired bandwidth.

DOCUMENTS OF PRIOR ART

Patent Documents

Patent Document 1: Japanese Patent Laid-Open No. 2002-158697
Patent Document 2: Japanese Patent Laid-Open No. 2005-159929

SUMMARY OF INVENTION

Technical Problem

However, the communication system disclosed in the above Patent Document 1, if the connection exceeding the throughput is requested, determines wireless communication terminals to change the connection based on the priority and then searches for the indirect routes for the wireless communication terminals which are pushed back on the priority list. Accordingly, if there is no indirect route as a result of search, these wireless communication terminals are disconnected, which may disable all of the wireless communication terminals in communication to maintain their connections.

In addition, in the wireless communication system disclosed in the above Patent Document 2, handoff is performed in response to a handoff request from the wireless communication terminal, that is, the terminal takes the initiative in performing handoff and thus the AP cannot secure the bandwidth by adjusting the number of connected terminals. Therefore, it is not possible to handle the connection request exceeding the throughput.

Accordingly, an object of the present invention in consideration of such aspects is to provide an access point, a wireless communication terminal and a server capable of handling a connection request exceeding the throughput while maintaining a communication state of a wireless communication terminal.

Solution to Problem

In order to achieve the above object, an access point according to a first aspect of the present invention includes:

a notification unit for notifying a server of a bandwidth deficit if, in response to a connection request including a required bandwidth received from a wireless connection terminal, the bandwidth cannot be ensured; and a request unit, based on information on a specific wireless communication terminal capable of changing an access point transmitted from the server in response to a notification by the notification unit, for requesting the specific wireless communication terminal to change a wireless interface to use.

A second aspect of the present invention is that, in the access point according to the first aspect, the notification unit includes: a connection request reception unit for receiving the connection request including the required bandwidth from the wireless communication terminal; and a bandwidth determination unit for determining whether a bandwidth fulfilling the request by the wireless communication terminal can be secured, and, if it is determined by the bandwidth determination unit that the bandwidth cannot be secured, notifies the server of the bandwidth deficit, and the request unit includes a terminal information reception unit for receiving the information on the specific wireless communication terminal transmitted from the server in response to the notification by the notification unit and, based on the information on the specific wireless communication terminal received by the terminal information reception unit, requests the specific wireless communication terminal to change the wireless interface being used.

A third aspect of the present invention is that, in the access point according to the first or the second aspect, the request unit, when requesting the specific wireless communication terminal to change the wireless interface being used, notifies the specific wireless communication terminal of information necessary for connection to a wireless communication network corresponding to a wireless interface of a changeover destination. Moreover, in order to achieve the above object, a wireless communication terminal according to a fourth aspect of the present invention includes:

at least two wireless interfaces;

a connection request unit, by using one of the wireless interfaces, for transmitting a connection request, including information on a required bandwidth and another wireless interface which is currently usable, to a corresponding access point of a first wireless communication network; and a control unit, when requested by the access point of the first wireless communication network to change to a connection request using the another wireless interface which is currently usable in response to the connection request from the connection request unit, for controlling the connection request unit to transmit a connection request to a corresponding access point of a second wireless communication network by using the another wireless interface.

Moreover, in order to achieve the above object, a server according to a fifth aspect of the present invention includes:

a memory unit for storing information on a bandwidth used by a wireless communication network corresponding to a wireless interface and a wireless interface which is currently usable by each wireless communication terminal;

a reception unit for receiving notification of a bandwidth deficit from an access point;

a terminal search unit for searching for a wireless communication terminal to change a wireless interface based on the information stored in the memory unit, in order to make up for the bandwidth deficit received by the reception unit; and a notification unit for notifying the access point of information on a wireless communication terminal searched by the terminal search unit.

Effects of the Invention

According to the access point (AP) of the present invention, if the bandwidth for a new wireless communication terminal from which a connection request is received cannot be secured, the AP takes the initiative in changeover of a connection of a specific wireless communication terminal which can change an access point according to the information transmitted from the server. Accordingly, it is possible to handle a connection request exceeding the throughput while maintaining a communication state of the wireless communication terminal.

In addition, according to the wireless communication terminal of the present invention, an AP takes the initiative in changing connection such that if the wireless communication terminal is requested by the AP of the first wireless communication network to change a connection request transmitted to the AP to a connection request to an AP of the second wireless communication network which is currently usable, the wireless communication terminal transmits the connection request to the AP of the second wireless communication network in response to the request. Accordingly, the wireless communication terminal can communicate by using the second wireless communication network without adversely affecting the communication states of other wireless communication terminals using the AP of the first wireless communication network.

Moreover, according to the server of the present invention, the server searches for a wireless communication terminal to change a wireless IF, when receiving a notification of bandwidth deficit from an AP, in order to make up for the bandwidth deficit and notifies the AP of the wireless communication terminal. Accordingly, the AP takes the initiative in changeover of the connection, which enables to handle the connection request exceeding the throughput while maintaining the communication state of the wireless communication terminal.

DESCRIPTION OF EMBODIMENTS

Embodiments of the present invention will be described with reference to the accompanying drawings. In the following description, a wireless communication system including an access point (base station), a wireless communication terminal and a server according to the present invention is described as an embodiment of the present invention, for the sake of convenience.

First Embodiment

Figure 1:
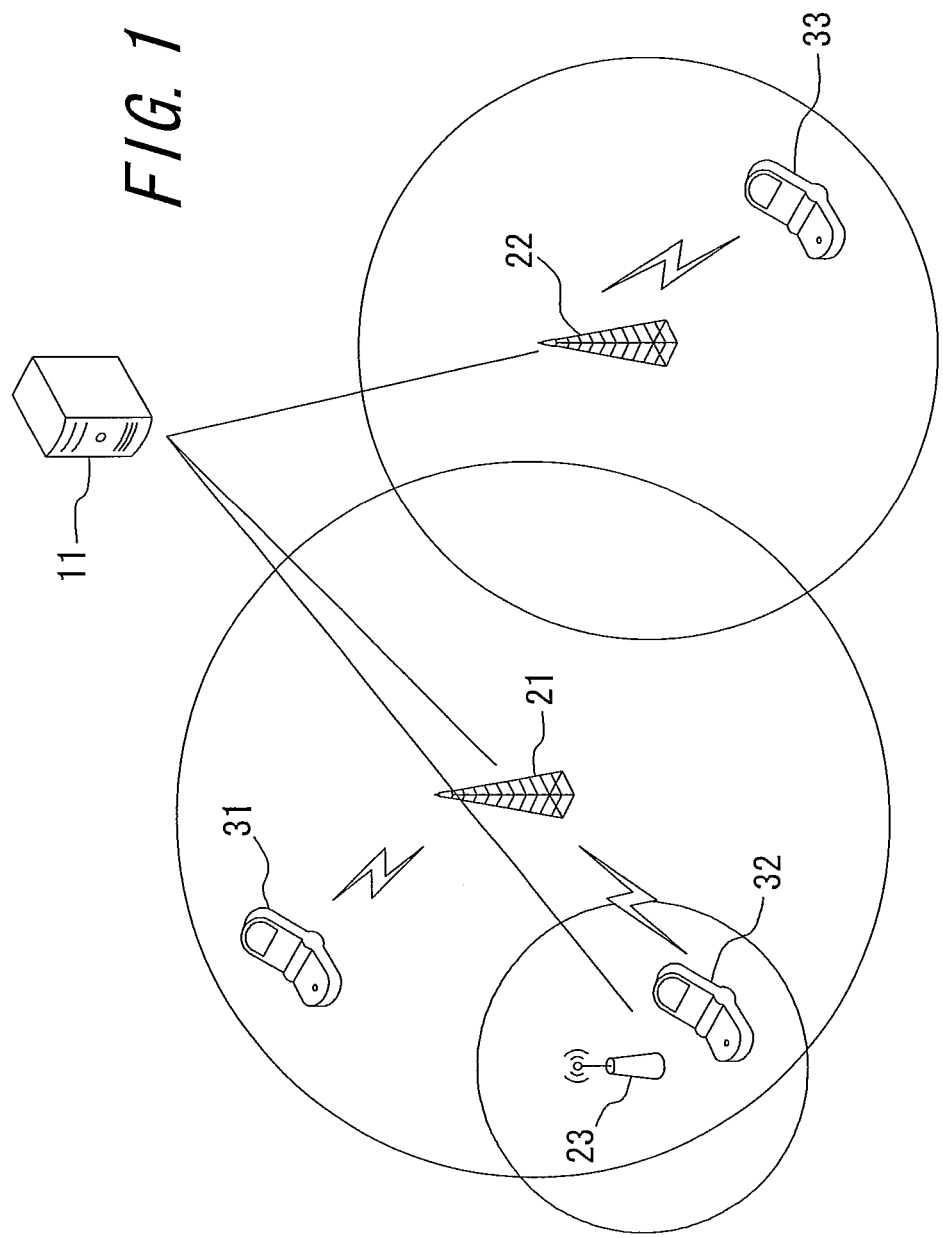
FIG. 1 is a schematic diagram of a wireless communication system according to a first embodiment of the present invention.

FIG. 1 is a schematic diagram illustrating a wireless communication system according to a first embodiment of the present invention. The wireless communication system shown in FIG. 1 has a server 11, a plurality of APs corresponding to different wireless communication networks either wired or wirelessly connected to the server 11 and a plurality of wireless communication terminals. FIG. 1 shows, as the plurality of APs, AP 21 and AP 22 of a CDMA network and AP 23 of a wireless LAN, by way of example. Each AP regularly transmits an announcement signal (signal) and is capable of communicating with wireless communication terminals within a wireless communication enable area, receivable area of the announcement signal, around the AP.

The wireless communication terminal communicates with a counterpart terminal via the AP by wirelessly connecting to any of the APs supporting a usable wireless W. FIG. 1 shows three wireless communication terminals 31, 32 and 33. The wireless communication terminal 31 is newly requesting a connection to the AP 21, whereas the wireless communication terminal 32 is connected to the AP 21 while being within the wireless communication enable area of the AP 23. The wireless communication terminal 33 is connected to the AP 22.

Figure 2:
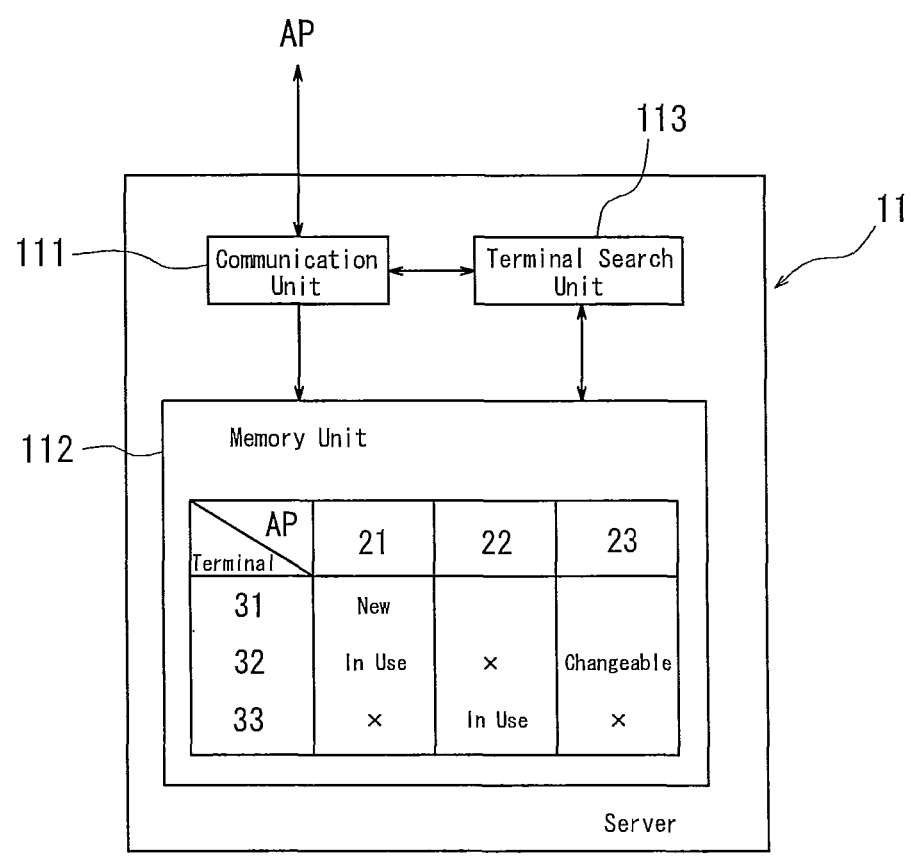
FIG. 2 is a functional block diagram illustrating a configuration of a main section of a server shown in FIG. 1.

FIG. 2 is a functional block diagram illustrating a configuration of a main section of the server 11 according to the present invention shown in FIG. 1. The server 11 has a communication unit 111, a memory unit 112 and a terminal search unit 113. The communication unit 111 communicates with each of the AP 21, 22 and 23 by being either wired or wirelessly connected thereto. The memory unit 112 stores terminal information such as, for example, the wireless IF currently used by the wireless communication terminal, the wireless IF currently usable, a bandwidth used by the wireless communication network corresponding to the wireless IF and the like, obtained from each AP via the communication unit 111. As shown in FIG. 2, a state shown in FIG. 1 as a part of the terminal information is stored in the memory unit 112. FIG. 2 shows that the memory unit 112 stores "New" for the AP 21, which indicates that the wireless communication terminal 31 newly requested connection to the AP 21 with regard to the wireless communication terminal 31; stores "In Use" for the AP 21 and "Changeable" for the AP 23 with regard to the wireless communication terminal 32; and stores "In Use" for the AP 22 with regard to the wireless communication terminal 33.

If the communication unit 111 receives an inquiry about a communication changeover terminal based on a bandwidth deficit from the AP, the terminal search unit 113, in order to make up for the bandwidth deficit, searches for a wireless communication terminal which can switch the wireless communication network, that is, the wireless IF based on the information stored in the memory unit 112. Then, the terminal search unit 113, via the communication unit 111, notifies the AP to which the wireless communication terminal is currently connected and, if necessary, the AP to which the wireless communication terminal is going to connect of the terminal information (changeover terminal information) searched. Accordingly, in FIG. 2, the communication unit 111 constitutes a reception unit for receiving a notification of the bandwidth deficit from the AP and a notification unit for notifying the AP of the information on the wireless communication terminal searched by the terminal search unit 113.

Figure 3:
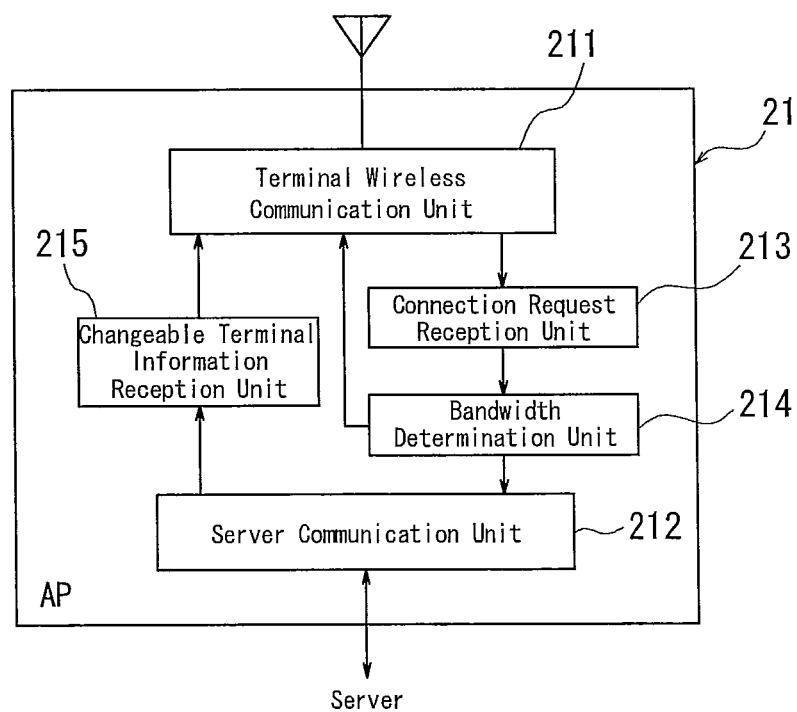
FIG. 3 is a functional block diagram illustrating a configuration of a main section of an AP shown in FIG. 1.

FIG. 3 is a functional block diagram illustrating a configuration of a main section of the AP according to the present invention shown in FIG. 1. Here, a configuration of the AP 21 of the CDMA network is described, for the sake of convenience. The AP 21 has a terminal wireless communication unit 211, a server communication unit 212, a connection request reception unit 213, a bandwidth determination unit 214 and a changeable terminal information reception unit 215. The terminal wireless communication unit 211 performs wireless communication with a wireless communication terminal having the wireless IF supporting the CDMA network. The server communication unit 212 communicates with the server 11 either wired or wirelessly. The connection request reception unit 213 receives a connection request from a new wireless communication terminal via the terminal wireless communication unit 211 and provides the bandwidth determination unit 214 with a result.

Upon reception of the connection request from the new wireless communication terminal, the bandwidth determination unit 214 compares information such as, for example, values of RSSI (Received Signal Strength Indicator) and SINR (Signal-to-Interference and Noise power Ratio) of the wireless communication terminal, a required bandwidth according to a desired application and the like with a vacant bandwidth currently available, and determines whether the required bandwidth can be obtained. If the required bandwidth can be obtained as a result, the bandwidth determination unit 214 transmits a connection permission to the wireless communication terminal via the terminal wireless communication unit 211 and transmits the wireless information including a connection state of the wireless communication terminal, another wireless IF currently usable received from the terminal and the bandwidth used to the server 11 via the server communication unit 212. In contrast, if the required bandwidth cannot be obtained, the bandwidth determination unit 214 transmits the inquiry about the communication changeover terminal including the bandwidth deficit to the server 11 via the server communication unit 212.

In addition, from the server 11 via the server communication unit 212, the changeable terminal information reception unit 215 receives information on a specific wireless communication terminal, that is, information (changeover terminal information) on a specific wireless communication terminal capable of changing the access point and making up for the bandwidth deficit in the notification to the server 11 from the bandwidth determination unit 214 by changing the wireless IF being used by the specific wireless communication terminal. Upon reception of the changeover terminal information, the changeable terminal information reception unit 215 transmits a changeover request of the wireless IF, that is, the request to change the wireless communication network to the wireless communication terminal via the terminal wireless communication unit 211. Accordingly, the connection request reception unit 213, the bandwidth determination unit 214 and the server communication unit 212 shown in FIG. 3 constitute a notification unit to notify the server 11 of the bandwidth deficit if the required bandwidth cannot be obtained in response to the connection request including the required bandwidth received from the wireless communication terminal. In addition, the changeable terminal information reception unit 215 and the terminal wireless communication unit 211 constitute a request unit for requesting the specific wireless communication terminal in the notification from the server 11 to change the wireless IF in use. Although it is not shown in the figure, the AP 22 and the AP 23 have the same configuration as that of the AP 21.

Figure 4:
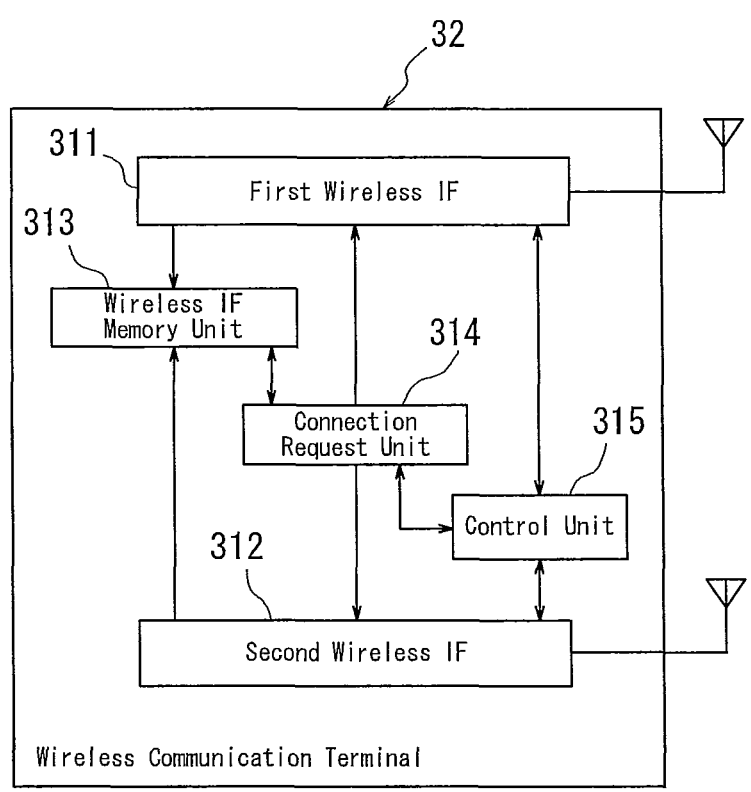
FIG. 4 is a functional block diagram illustrating a configuration of a main section of a wireless communication terminal shown in FIG. 1.

FIG. 4 is a functional block diagram illustrating a configuration of a main section of the wireless communication terminal according to the present invention shown in FIG. 1. Here, a configuration of the wireless communication terminal 32 is shown, for the sake of convenience. The wireless communication terminal 32 has a first wireless IF (interface) 311, a second wireless IF (interface) 312, a wireless IF memory unit 313, a connection request unit 314 and a control unit 315 for controlling each unit. The first wireless IF 311 can communicate with AP of the CDMA network, whereas the second wireless IF 312 can communicate with AP of the wireless LAN. Each of the IFs has a transmission and reception unit for voice and data, as well as a modulation/demodulation processing unit and the like. The wireless communication terminal 32 may also have a wireless IF corresponding to another wireless communication network.

The wireless IF memory unit 313 stores information on the wireless IF currently usable, that is, the wireless communication network information. Here, the information on the wireless IF currently usable is information to clarify all connectable wireless IFs regardless of an existence of a service contract of the wireless IF mounted in the wireless communication terminal 32. The wireless communication terminal 32 may recognize the wireless IF information by receiving an announcement signal (signal) regularly transmitted by the AP of each wireless communication network or may recognize wireless IF currently usable by actually attempting connection to the wireless IFs except for the wireless IF desired to start connection thereto before performing connection, for example.

If the communication is performed by using, for example, the first wireless IF 311 among the plurality of wireless IFs, the connection request unit 314 transmits the connection request to a corresponding AP via the first wireless IF 311. If information on another wireless IF currently usable is stored in the wireless IF memory unit 313, the connection request unit 314 transmits the connection request including this information. In order to enable the AP to determine whether it can obtain the required bandwidth, the connection request unit 314, at start of connection to the AP, notifies the AP of information on current values of RSSI and SINR by the wireless IF which initiates the connection, the required bandwidth according to a desired application and the like.

Based on the changeover request of the wireless IF transmitted from the AP being connected, that is, the request to change the wireless communication network, the control unit 315 controls the connection request unit 314 to change the wireless IF being used and to transmit the connection request to a corresponding AP via a wireless IF after changeover. Although not shown, the wireless communication terminal 31 and the wireless communication terminal 33 have the same configuration as that of the wireless communication terminal 32 or configured to have only the first wireless IF 311 capable of communicating with the AP of the CDMA network as the wireless IF.

Figure 5:
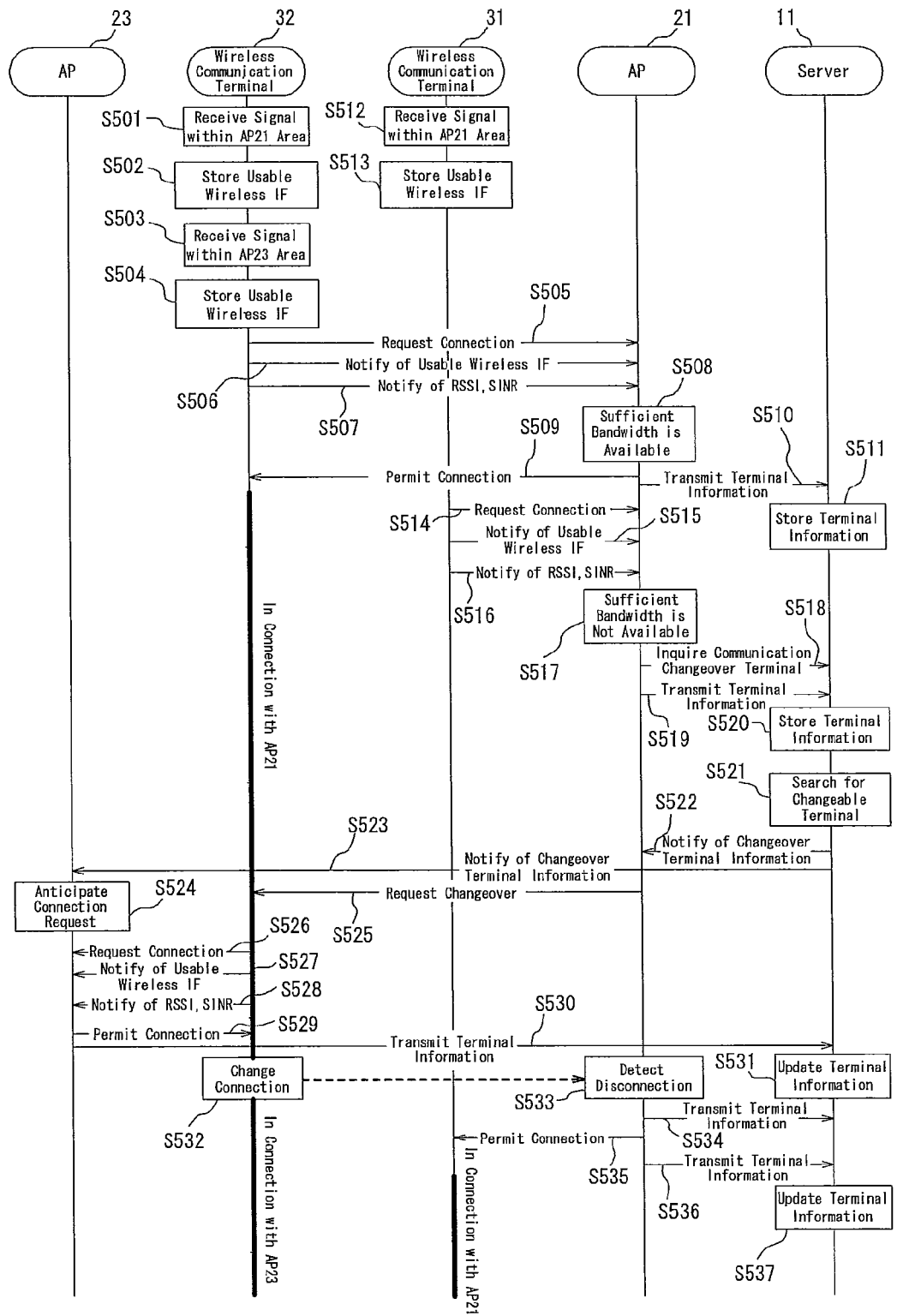
FIG. 5 is a sequence diagram illustrating operations by the wireless communication system shown in FIG. 1.

FIG. 5 is a sequence diagram illustrating operations by the wireless communication system shown in FIG. 1. FIG. 5 shows a sequence by the server 11, the AP 21, the AP 23, the wireless communication terminal 31 and the wireless communication terminal 32. When the wireless communication terminal 32 enters a wireless area of the AP 21 and the first wireless IF 311 receives an announcement signal (signal) from the AP 21 (S501), the wireless communication terminal 32 stores the first wireless IF 311 as a usable wireless IF in the wireless IF memory unit 313, regardless of the existence of the service contract of the first wireless IF 311 (S502). Moreover, when the wireless communication terminal 32 enters a wireless area of the AP 23 and the second wireless IF 312 receives a signal from the AP 23 (S503), the wireless communication terminal 32 also stores the second wireless IF 312 as the usable wireless IF in the wireless IF memory unit 313, regardless of the existence of the service contract of the second wireless IF 312 (S504).

In this state if the connection request, the usable wireless IF, the current values of RSSI and SINR are transmitted from the wireless communication terminal 32 to the AP 21 (S505-S507) and information of such is received by the AP 21, the AP 21 determines whether there remained a sufficient bandwidth to secure the required bandwidth for the wireless communication terminal 32, based on the information received. If there remained the sufficient bandwidth to secure the required bandwidth as a result (S508), the AP 21 transmits a connection permission to the wireless communication terminal 32 (S509) as well as transmitting terminal information including a connection state, a bandwidth used and another usable wireless IF of the wireless communication terminal 32 to the server 11 (S510).

Thereby, the wireless communication terminal 32 receives the connection permission from the AP 21 and executes the application by wirelessly connecting to the AP 21. In addition, by receiving the terminal information from the AP 21, the server 11 stores it in the memory 112 (S511). In this case, "In Use" for the AP 21 and "Changeable" for the AP 23 are stored in the memory unit 112 as a part of the terminal information of the wireless communication terminal 32.

On the other hand, when the wireless communication terminal 31 enters the wireless area of the AP 21 and the first wireless IF 311 receives the signal from the AP 21 (S512), the wireless communication terminal 31 stores the first wireless IF 311 as the usable wireless IF in the wireless IF memory unit 313, regardless of the existence of the service contract of the first wireless IF 311 (S513).

Then, while the wireless communication terminal 32 is connected to (using) the AP 21, the wireless communication terminal 31 transmits a connection request, the usable wireless IF and current values of RSSI and SINR to the AP 21 (S514-S516). Upon reception of information of such, the AP 21 determines whether there remained a sufficient bandwidth to secure the required bandwidth of the wireless communication terminal 31, based on the information received. If there remained no sufficient bandwidth to secure the required bandwidth as a result (S517), the AP 21 transmits the inquiry about the communication changeover terminal including the bandwidth deficit to the server 11 (S518) and transmits the connection state of the wireless communication terminal 31 and the terminal information thereof (S519).

Thereby, the server 11 receives the terminal information from the AP 21 and stores it in the memory unit 112 (S520). In this case, "New" for the AP 21 is stored in the memory unit 112 as a part of the terminal information of the wireless communication terminal 31. In addition, upon reception of the inquiry about the communication changeover terminal, the server 11 searches in the memory unit 112 for the wireless communication terminal capable of changing and making up for the bandwidth deficit, that is, the specific wireless communication terminal capable of changing its access point to an AP of a different wireless communication network (S521). If the wireless communication terminal 32 being connected to the AP 21 is searched as the specific wireless communication terminal capable of changing its access point to the AP 23 as a result, the server 11 notifies the AP 21 (S522), as well as the AP 23, changeover destination (S523), of the changeover terminal information indicating accordingly.

By receiving the changeover terminal information from the server 11, the AP 23 anticipates transmission of the connection request accompanying changeover of the connection from the wireless communication terminal 32 (S524). In addition, upon reception of the changeover terminal information from the server 11, the AP 21 transmits the changeover request of the wireless IF to the wireless communication terminal 32 being connected (S525).

Upon reception of the changeover request from the AP 21, the wireless communication terminal 32 transmits the connection request, the usable wireless IF, the current values of RSSI and SINR with the AP 23 to the AP 23 as the changeover destination, via the second wireless IF 312 (S526-S528). Then, upon reception of information of such from the wireless communication terminal 32, the AP 23 issues the connection permission to the wireless communication terminal 32 (S529) and transmits the terminal information indicating a state of the wireless communication terminal 32 to the server 11 (S530).

Thereby, the server 11 updates the terminal information of the wireless communication terminal 32 in the memory unit 112 by receiving the terminal information from the AP 23 (S531). In this case, accordingly, the terminal information of the wireless communication terminal 32 is updated from "Changeable" to "In Use" for the AP 23. In addition, upon reception of the connection permission from the AP 23, the wireless communication terminal 32 performs changeover of the connection by disconnecting from the AP 21 and by establishing a wireless connection with the AP 23 (S532) and, thereafter, executes the application via the AP 23.

In addition, upon detecting that the wireless communication terminal 32 disconnects from the AP 21 (S533), the AP 21 transmits the terminal information indicating accordingly to the server 11 (S534), transmits the connection permission to the wireless communication terminal 31 as a new terminal (S535), and further transmits the terminal information indicating that the AP 21 is wirelessly connected to the wireless communication terminal 31 to the server 11 (S536).

Thereby, the wireless communication terminal 31 as the new terminal wirelessly connects to the AP 21 and executes the application. In addition, based on the terminal information received at S534 and S536, the server 11 updates contents of the memory unit 112 (S537). In this case, accordingly, the terminal information of the wireless communication terminal 31 is updated from "New" to "In Use" for the AP 21, whereas the terminal information of the wireless communication terminal 32 is updated from "In Use" to "Changeable" for the AP 21.

According to the present embodiment, as set forth above, the server 11 monitors wireless communication terminals connecting to each AP as well as whether each wireless communication terminal can change its connection to another AR. If an AP which receives a connection request from a new wireless communication terminal cannot secure the bandwidth required by this wireless communication terminal, the server 11 searches for a specific wireless communication terminal which, among wireless communication terminals connecting to the AP, enables to secure the required bandwidth for the new wireless communication terminal by changing its connection to AP of another wireless communication network and notifies the AP of the specific terminal. Then, the AP changes the connection of the specific wireless communication terminal notified from the server 11 to AP of another wireless communication network. Thereby, it is possible to handle the connection request of the new wireless communication terminal exceeding the throughput while maintaining the communication state of the specific wireless communication terminal.

Second Embodiment

Figure 6:
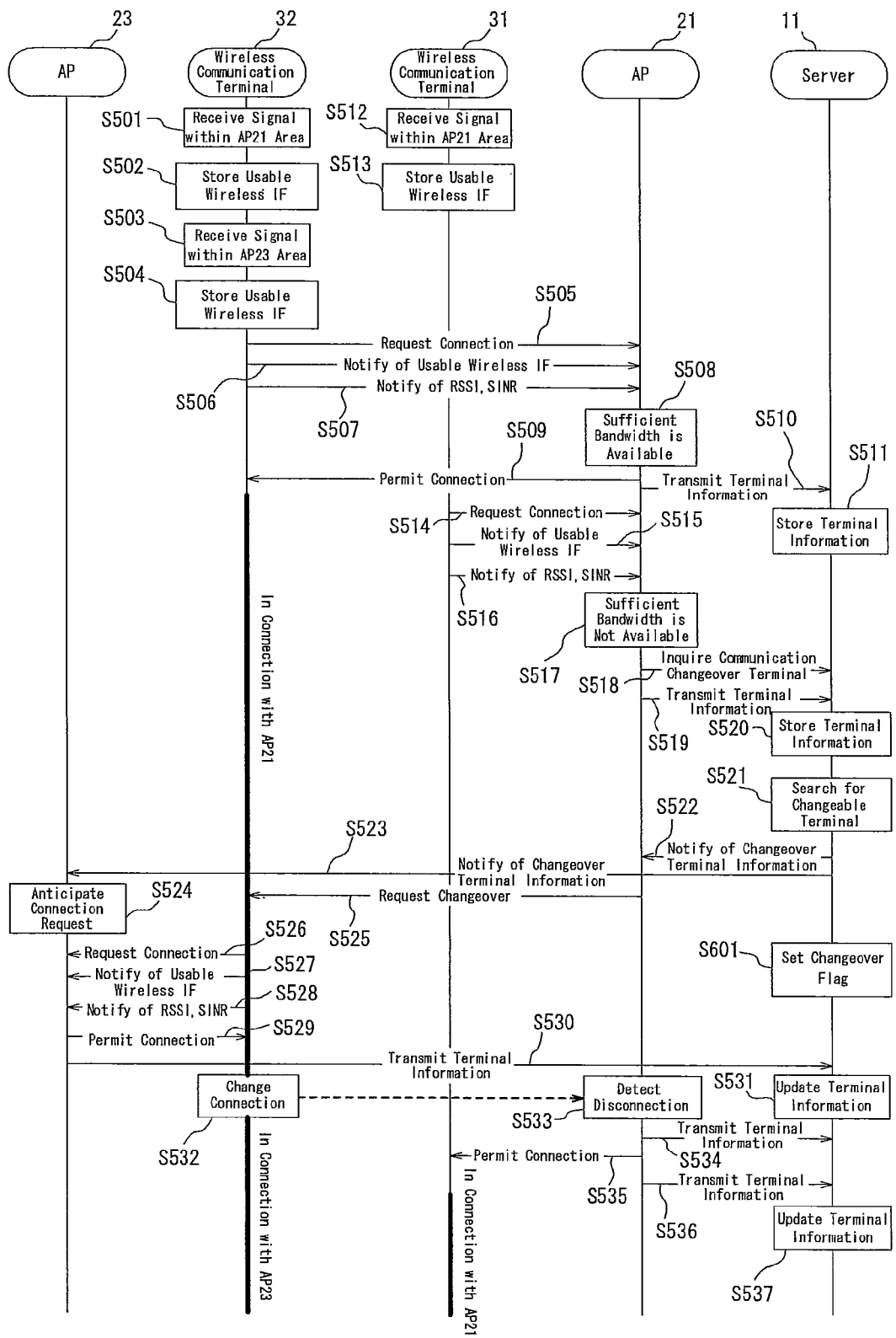
FIG. 6 is a sequence diagram illustrating operations by a wireless communication system according to a second embodiment of the present invention.
Figure 7:
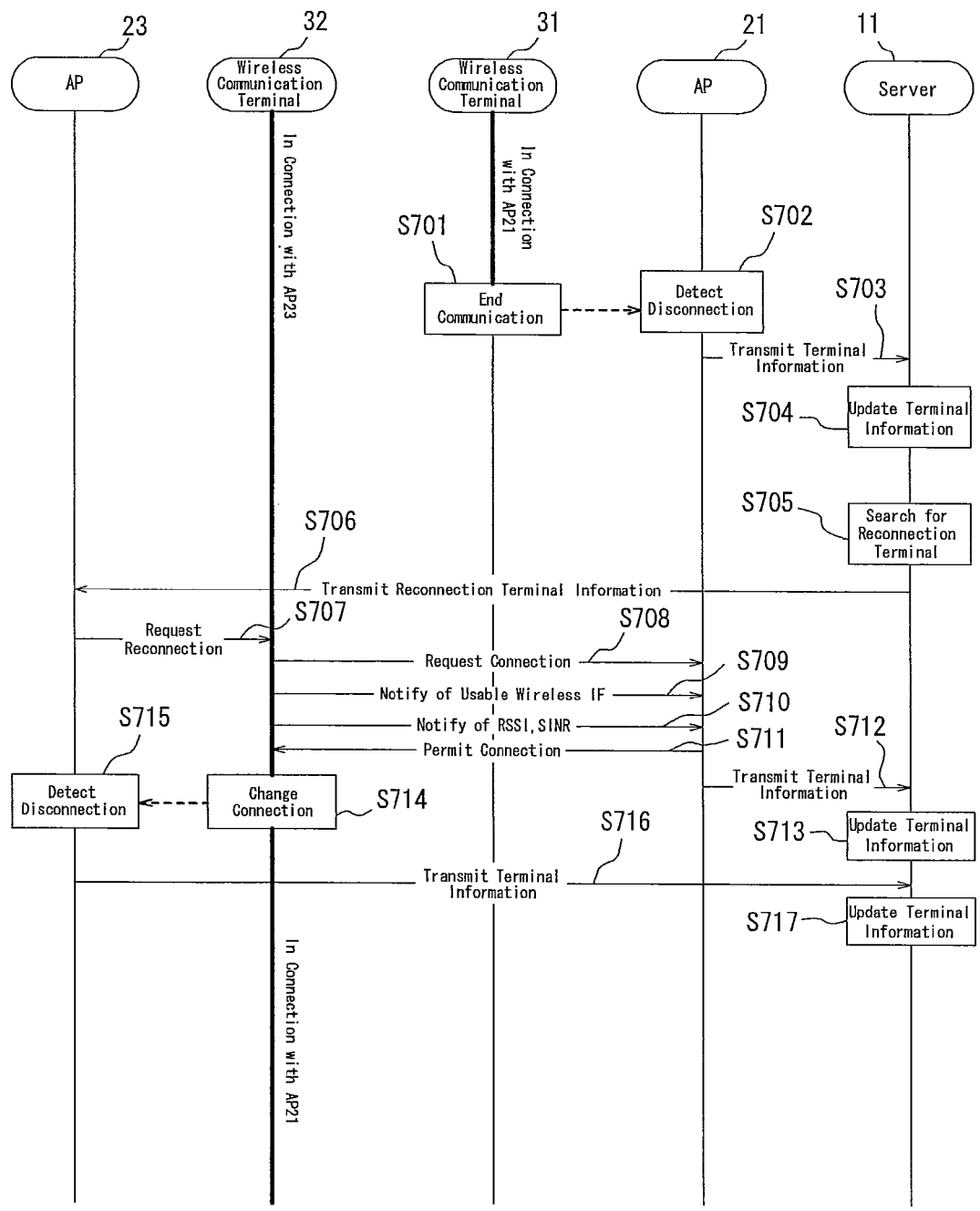
FIG. 7 is a sequence diagram illustrating operations by the wireless communication system according to the second embodiment of the present invention.

FIG. 6 and FIG. 7 are sequence diagrams illustrating operations by a wireless communication system according to a second embodiment of the present invention. In the same manner as FIG. 5, FIG. 6 and FIG. 7 show sequences by the server 11, the AP 21, the AP 23, the wireless communication terminal 31 and the wireless communication terminal 32. It is to be noted that the same operations as those in FIG. 5 are represented by the same numeral signs and descriptions thereof are omitted.

The wireless communication system according to the present embodiment changes again connection of the wireless communication terminal 32, which has changed connection from the AP 21 in communication to the AP 23 of another wireless communication network due to the connection request from the wireless communication terminal 31 as the new terminal, to its original AP 21 if the AP 21 can secure a communication bandwidth of the wireless communication terminal 32 by end of communication with the wireless communication terminal 31 or the like, with the configuration according to the first embodiment.

According to the present embodiment, therefore, as shown in FIG. 6, the server 11 searches for the wireless communication terminal 32 capable of changing the access point from the AP 21 (S521). Upon notification of a result of such searching to the AP 21 and the AP 23 as the changeover destination (S522 and S523), a changeover flag indicating that the access point of the wireless communication terminal 32 is changed, that is, the wireless communication network is changed is set to the terminal information of the wireless communication terminal 32 stored in the memory unit 112 (S601).

Then, while the wireless communication terminal 32 executes communication via the AP 23 after changing the access point thereto if, for example, the wireless communication terminal 31 newly connected to the AP 21 ends its communication and disconnects from the AP 21 (S701) and the AP 21 detects such state (S702) as shown in FIG. 7, the AP 21 transmits the terminal information indicating accordingly to the server 11 (S703).

Thereby, the server 11 updates the terminal information in the memory unit 112 by receiving the terminal information from the AP 21 (S704). In this case, accordingly, the terminal information of the wireless communication terminal 31 is cleared from the memory unit 112. In addition, after updating the terminal information in the memory unit 112, the terminal search unit 113 of the server 11 searches for a wireless communication terminal with the changeover flag, that is, the wireless communication terminal capable of reconnecting to the AP 21 in the memory unit 112 (S705). If the wireless communication terminal 32 is searched as a result, the server 11 notifies the AP 23, to which the wireless communication terminal 32 is currently connected, of re-changeover terminal information that the wireless communication terminal 32 can be reconnected to its original access point AP 21 (S706).

Upon reception of the re-changeover terminal information from the server 11, the AP 23 transmits a reconnection request prompting reconnection to its original access point AP 21 to the corresponding wireless communication terminal 32 (S707). Thereby, the wireless communication terminal 32 transmits the connection request, the usable wireless IF and the current values of RSSI and SINR with the AP 21 to its original access point AP 21 (S708-S710). Upon reception of information of such from the wireless communication terminal 32, the AP 21 issues the connection permission to the wireless communication terminal 32 (S711) and transmits the terminal information indicating the state of the wireless communication terminal 32 to the server 11 (S712). Thereby, the server 11 updates the terminal information of the wireless communication terminal 32 in the memory unit 112 from "Changeable" to "In Use" for the AP 21 (S713).

Upon reception of the connection permission from the AP 21, the wireless communication terminal 32 performs changeover of the connection by establishing reconnection to the AP 21 and disconnecting from the AP 23 (S714) and, thereafter, executes the application via the AP 21. In addition, when detecting that the wireless communication terminal 32 disconnects from the AP 23 (S715), the AP 23 transmits the terminal information indicating accordingly to the server 11 (S716). Thereby, the server 11 updates the terminal information of the wireless communication terminal 32 in the memory unit 112 from "In Use" to "Changeable" for the AP 23 (S717).

In the above description, if the wireless communication terminal 31 newly connected to the AP 21 ends the communication, the wireless communication terminal 32 which has changed its connection from the AP 21 to the AP 23 is reconnected to its original access point AP 21. However, according to the present embodiment, the wireless communication terminal 32 is reconnected to its original access point 21 in the same manner if the communication bandwidth for the wireless communication terminal 32 is secured as another wireless communication terminal connected to the AP 21 ends its communication while the wireless communication terminal 31 is still in communication.

According to the present embodiment, as set forth above, if the AP 21 secures the communication bandwidth of the wireless communication terminal 32, which has changed its connection from the AP 21 to the AP 23 of another wireless communication network, the wireless communication terminal 32 is once again changed to connect from the AP 23 to the AP 21 of its original wireless communication network, in addition to the operation according to the first embodiment. Thereby, in addition to advantages by the first embodiment, it is possible, for example, to reduce a burden on a user if a communication charge of the wireless communication network of the AP 23 is higher than that of the wireless communication network of the AP 21. It is to be appreciated that, in addition to the above advantages described by way of example, there are more advantages by returning to the original wireless communication network.

Third Embodiment

Figure 8:
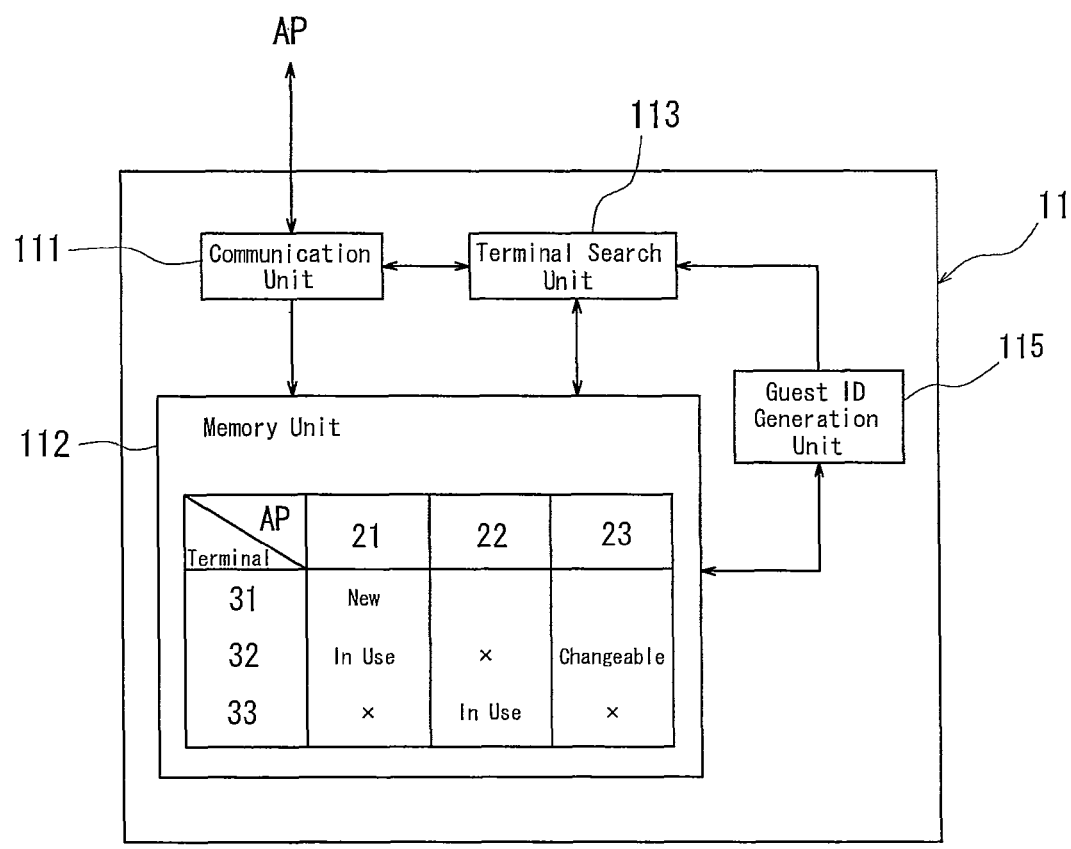
FIG. 8 is a functional block diagram illustrating a configuration of a main section of a server used by a wireless communication system according to a third embodiment of the present invention.

FIG. 8 is a functional block diagram illustrating a configuration of a main section of a server used in a wireless communication system according to a third embodiment of the present invention. The server 11 has a guest ID generation unit 15 in addition to the configuration shown in FIG. 2. In order to let a wireless communication terminal having a plurality of wireless IFs corresponding to a plurality of wireless communication networks use a wireless IF of a wireless communication network without the service contract, the guest ID generation unit 115 generates a guest ID necessary to use the wireless IF, stores the guest ID as terminal information in the memory unit 112 and then notifies the AP to which the wireless communication terminal is connecting and the AP to which the wireless communication terminal changes connection of the guest ID via the terminal search unit 113 and the communication unit 111. Thereby, the wireless communication terminal changes its connection by using the guest ID generated according to the present embodiment.

Figure 9:
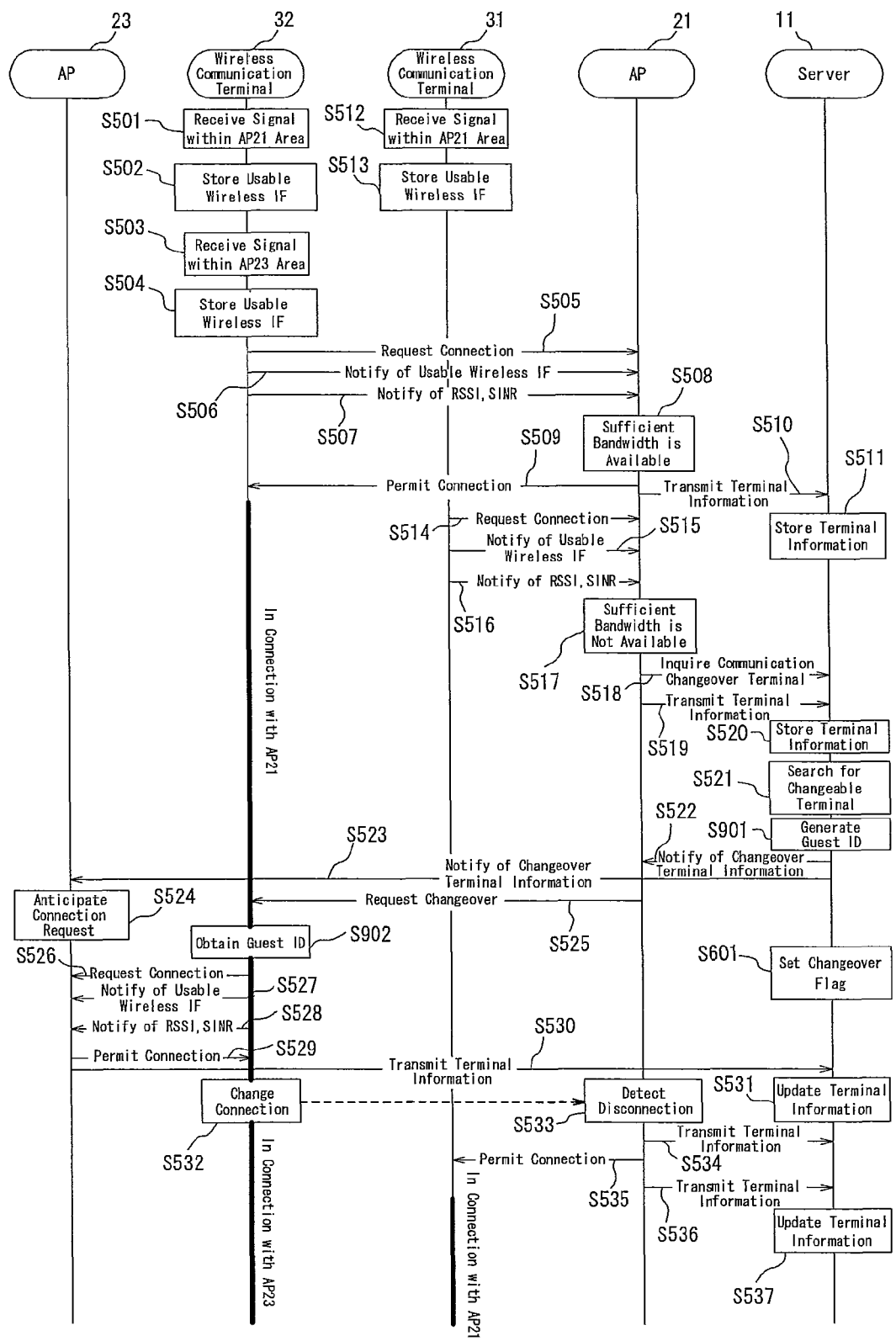
FIG. 9 is a sequence diagram illustrating exemplary operations by the wireless communication system according to the third embodiment of the present invention.
Figure 10:
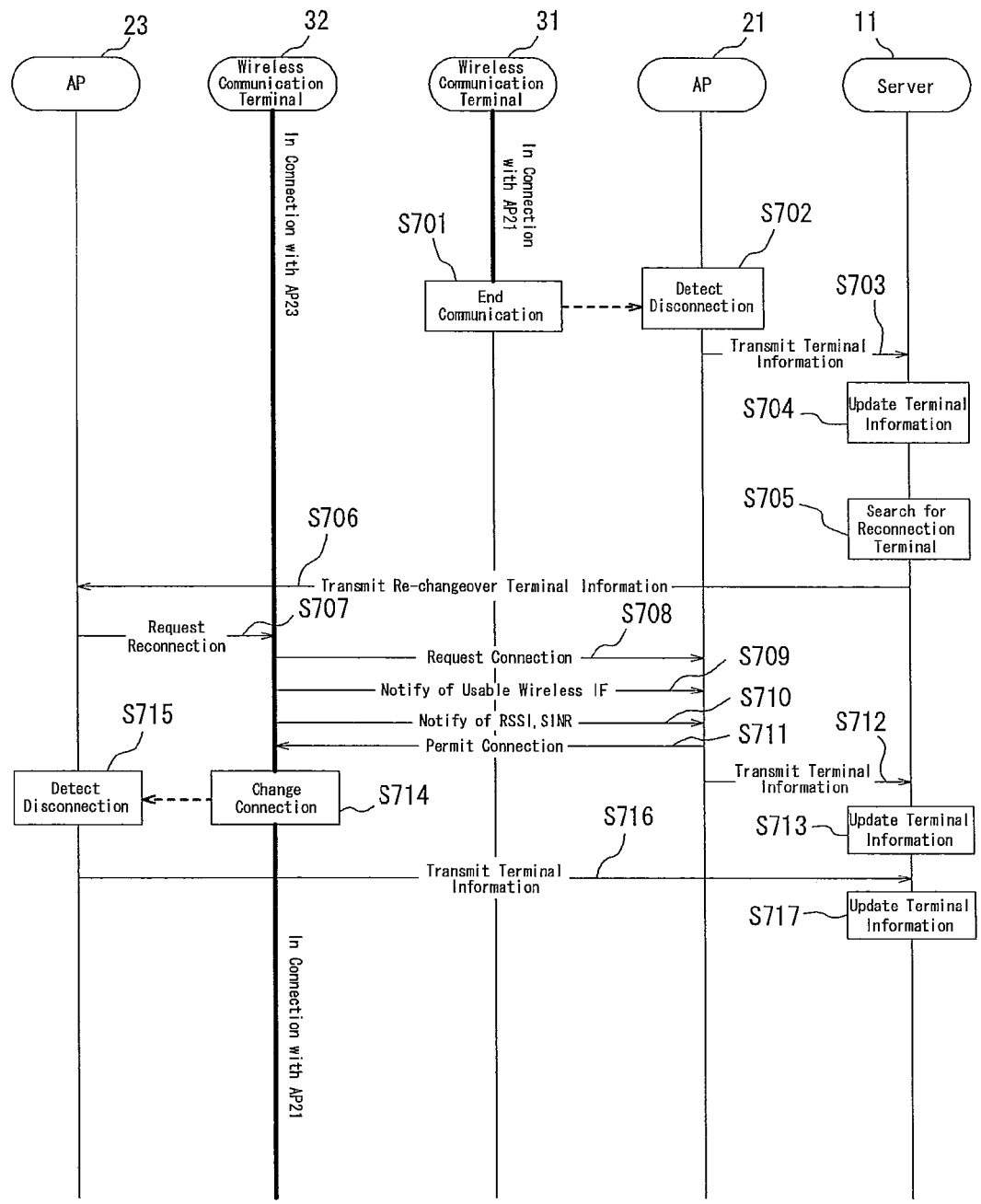
FIG. 10 is a sequence diagram illustrating exemplary operations by the wireless communication system according to the third embodiment of the present invention.

FIG. 9 and FIG. 10 show sequence diagrams illustrating exemplary operations by the wireless communication system according to the third embodiment of the present invention. According to the present embodiment, it is assumed that each of the wireless communication terminal 31 and the wireless communication terminal 32 has a service contract to use the wireless communication network using the first wireless IF 311. It is to be noted that the same operations as those in FIG. 6 and FIG. 7 are represented by the same reference signs and descriptions thereof are omitted. According to the present embodiment, however, in order to generate the guest ID to allow a wireless communication terminal to use a wireless IF of a wireless communication network without the service contract, notification of usable wireless IFs, transmitted to the AP 21 at step S506 when the wireless communication terminal 32 newly connects to the AP 21 as shown in FIG. 9, includes whether there is the service contract of each of the usable wireless IFs. Similarly, the notification of the usable wireless IF, transmitted to the AP 21 at step S515 when the wireless communication terminal 31 newly connects to the AP 21, includes whether there is the service contract of each of the usable wireless IFs.

As shown in FIG. 9, according to the present embodiment, when the server 11 searches the wireless communication terminal 32 capable of changing the access point from the AP 21 (S521), the guest ID generation unit 115 generates the guest ID for connection to the AP 23 (S901). Then, the guest ID generated is stored as the terminal information in the memory unit 112 and included in the changeover terminal information, and notified to the AP 21 and the AP 23 as the changeover destination (S522, S523). At S525, the AP 21 transmits the changeover request of the wireless IF including the guest ID notified by the server 11 to the wireless communication terminal 32 being connected.

Upon reception of the changeover request from the AP 21, the wireless communication terminal 32 obtains the guest ID included in the request (S902) and, by using the guest ID, transmits the connection request to the AP 23 at S526. Then, upon reception of the connection permission from the AP 23, the wireless communication terminal 32 establishes the wireless connection to the AP 23 and disconnects from the AP 21 in order to change the access point (S532). Thereafter, the wireless communication terminal 32 executes the application by using the AP 23 and the guest ID.

Then, as shown in FIG. 10, when the wireless communication terminal 31 connected to the AP 21 ends the communication while the wireless communication 32 communicates via the AP 23 and then the wireless communication terminal 32 establishes reconnection to the AP 21 and disconnects from the AP 23 at S714, the wireless communication terminal 32 clears the guest ID obtained at S902. In addition, when updating the terminal information of the wireless communication terminal 32 in the memory unit 11 based on the terminal information transmitted from the AP 23 at S717, the server 11 clears the guest ID recorded for the wireless communication terminal 32.

Figure 11:
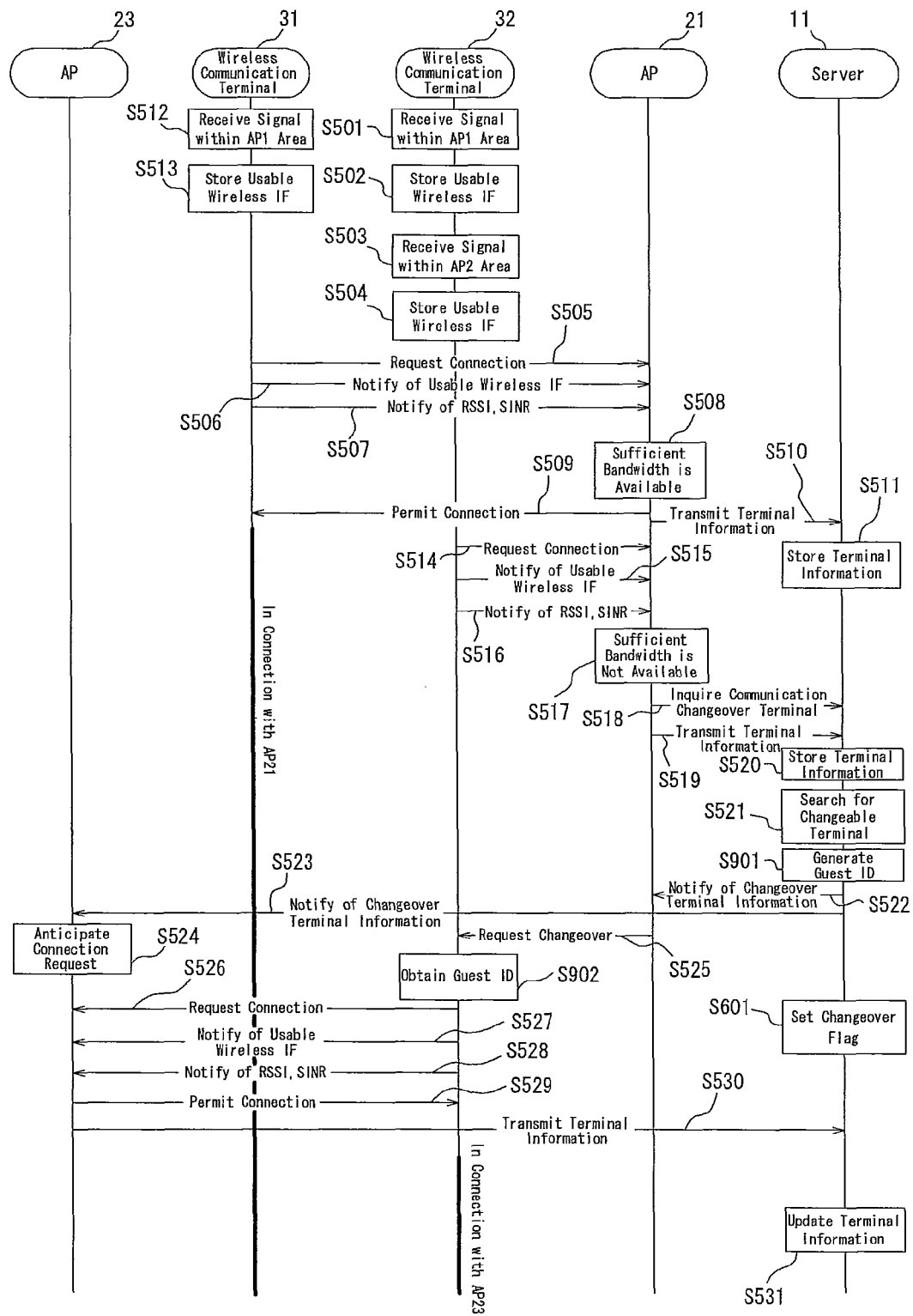
FIG. 11 is a sequence diagram illustrating another exemplary operations by the wireless communication system according to the third embodiment of the present invention.
Figure 12:
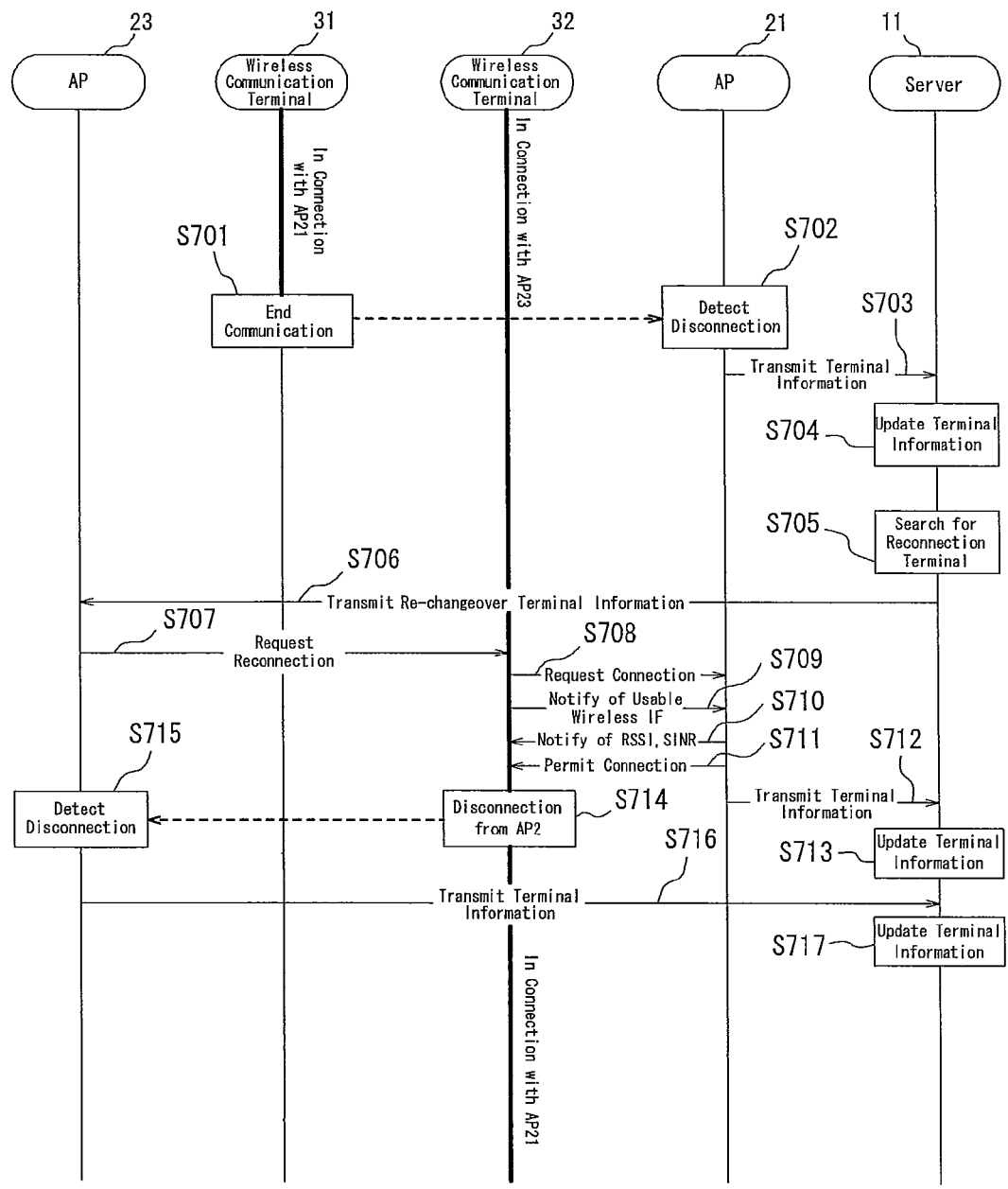
FIG. 12 is a sequence diagram illustrating another exemplary operations by the wireless communication system according to the third embodiment of the present invention.

FIG. 11 and FIG. 12 show sequence diagrams illustrating another exemplary operations by the wireless communication system according to the third embodiment of the present invention. These exemplary operations are carried out when, while the wireless communication terminal 31 is within the wireless communication enable area of the AP 21 and the wireless communication terminal 32 is within the wireless communication enable area of both of the AP 21 and the AP 23 as shown in FIG. 1, the wireless communication terminal 32 newly transmits a connection request to the AP 21 while the wireless communication terminal 31 is already communicating with the AP 21, in a manner contrary to the exemplary operations shown in FIG. 9 and FIG. 10.

In these exemplary operations, if the AP 21 cannot secure the required bandwidth of the wireless communication terminal 32 at S517 and the server 11 cannot find the communication changeable terminal at S521, the wireless communication terminal 32 is notified of the guest ID to be used for the communication with the AP 23 by the server 11 via the AP 21 (S522, S525). That is, in response to the connection request transmitted to the AP 21 by using the first wireless IF 311 (S514-S516), the wireless communication terminal 32 is requested to change from the connection request using the AP 21 to the connection request using the AP 23 which is currently usable. In this exemplary operations, the wireless communication terminal 32 which transmitted the connection request is thus the specific wireless communication terminal capable of changing its access point. Thereby, the control unit 315 of the wireless communication terminal 32 changes the access point to the AP 23, and controls the second wireless IF 312 to transmit the connection request to the AP 23 by using the guest ID obtained at S902. Thereafter, the wireless communication terminal 32 executes the communication via the AP 23 (S526-S529).

In addition, when the wireless communication terminal 31 ends the communication and disconnects from the AP 21, the AP 23 receives the re-changeover terminal information notified by the server 11 (S706) and transmits the reconnection request to the wireless communication terminal 32 to reconnect to the AP 21 (S707). Thereby, the wireless communication terminal 32 changes its connection to the AP 21 of the wireless communication network to which the first connection request is transmitted and with which the wireless communication terminal has the service contract (S708-S711, S714) and executes the communication via the AP 21 thereafter. Since other operations are the same as the exemplary operations in FIG. 9 and FIG. 10, they are represented by the same reference signs and descriptions thereof are omitted.

According to the present embodiment, as set forth above, when changing the connection of the wireless communication terminal 32 from the wireless communication network using the first wireless IF 311 with the service contract to the wireless communication network using the second wireless IF 312 without the service contract, the server 11 generates the guest ID to be used for the communication with the AP 23 corresponding to the second wireless IF 312. Then, the wireless communication terminal 32 and the AP 23 are notified of the guest ID generated, such that the wireless communication terminal 32 connects to the AP 23. Accordingly, it prevents the user from a burden of charge by using the second wireless IF 312 without the service contract. It is to be noted that it is also possible to modify the another exemplary operations according to the third embodiment (FIG. 11, FIG. 12) not to use the guest ID, assuming that the user has the service contracts with all the wireless IFs in the same manner as the first and the second embodiments. It is also possible to modify not to reconnect in the same manner as the first embodiment.

Next, main operations by the server 11 and the AP 21 constituting the wireless communication system according to each of the above embodiments are described.

First, terminal information processing and the changeable terminal search processing by the server 11 are described with reference to flowcharts shown in FIG. 13 and FIG. 14, the configuration diagrams shown in FIG. 2 and FIG. 8 and the sequence diagrams shown in FIGS. 5-7 and FIGS. 9-12.

Figure 13:
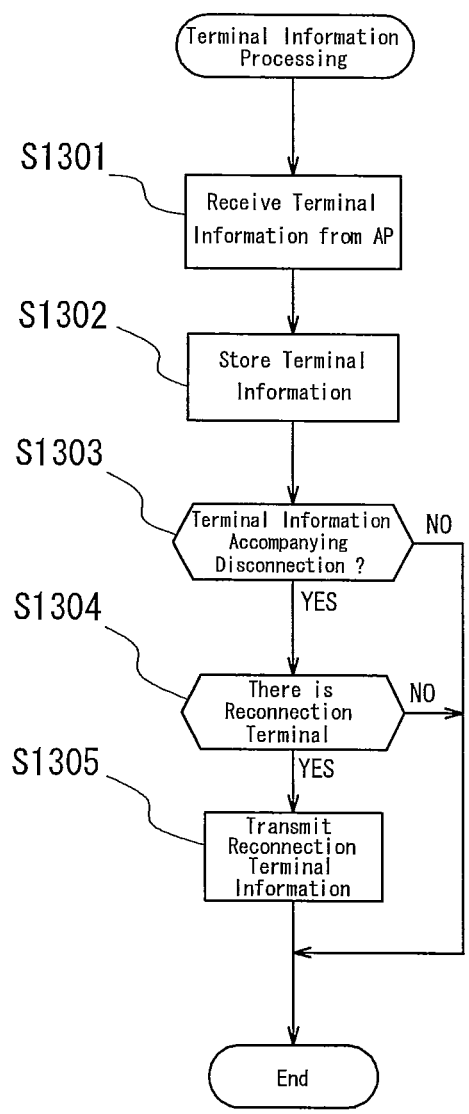
FIG. 13 is a flowchart illustrating operations of terminal information processing by the server shown in FIG. 1.

FIG. 13 is a flowchart illustrating operations of the terminal information processing by the server 11. In the terminal information processing, the server 11 stores the terminal information transmitted from the AP according to the first embodiment, and further searches for a reconnection terminal and notifies the AP of the terminal according to the second and the third embodiments. First, when the communication unit 111 receives the terminal information from the AP (S1301), the server 11 stores the terminal information in the memory unit 112 (S1302).

According to the second and the third embodiments, the terminal search unit 113 of the server 11 further determines whether the terminal information received at S1301 was transmitted accompanying disconnection (see S703) of a wireless communication terminal (S1303). If the terminal information accompanies disconnection, the terminal search unit 113 of the server 11 further searches for a reconnection terminal with the changeover flag in the memory unit 112 (S1304, see S705). If the reconnection terminal is searched as a result, the server 11 transmits the reconnection terminal information to the AP (AP 23 according to the second and the third embodiments) to which the corresponding wireless communication terminal (wireless communication terminal 32 according to the second and the third embodiments) is currently connected via the communication unit 111 (S1305, see S706). If the terminal information received does not accompany disconnection at S1303 or if there is no reconnection terminal with the changeover flag in the memory unit 112 at S1304, the operation ends as it stands.

Figure 14:
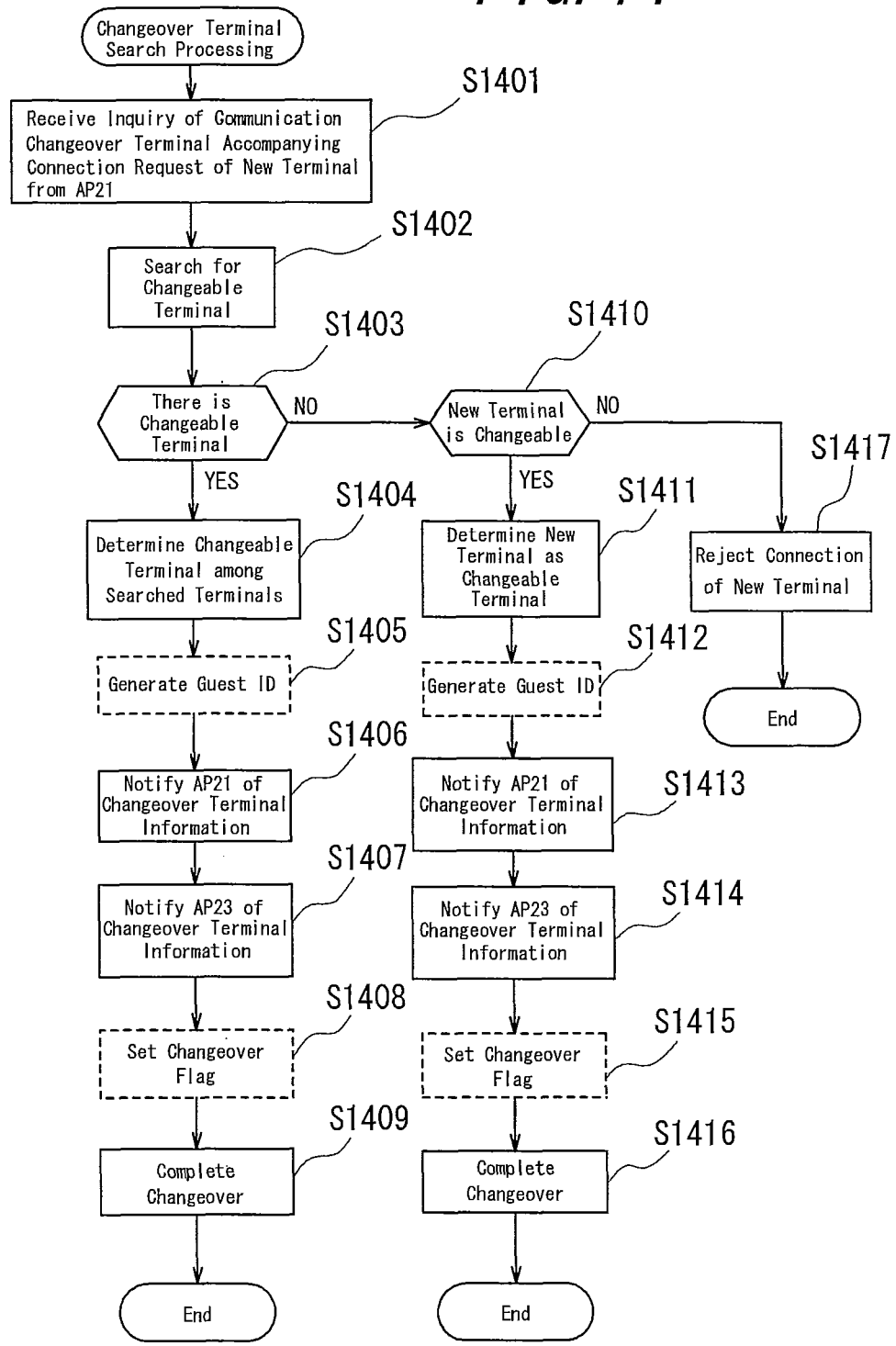
FIG. 14 is a flowchart illustrating operations of changeover terminal search processing by the server shown in FIG. 1.

FIG. 14 is a flowchart illustrating operations of the changeover terminal search processing by the server 11. In the changeover terminal search processing, first, when the communication 111 receives the inquiry about the communication changeover terminal from AP 21 due to a connection request of a new wireless communication terminal (see S518) (S1401), the terminal search unit 113 of the server 11 searches for a changeable terminal among the wireless communication terminals already connecting to the AP 21 based on the terminal information stored in the memory unit 112 (S1402, see S521) and determines whether there is a changeable terminal (S1403). If there is a changeable terminal as a result, the terminal search unit 113 determines the wireless communication terminal searched as the changeable terminal (S1404). According to the second and the third embodiments, furthermore, the guest ID generation unit 115 (see FIG. 8) generates the guest ID of the changeable terminal determined (S1405, see S901) and the server 11 notifies the AP 21 (S1406, see S522), as well as the AP 23 as the changeover destination (S1407, see S523) of the changeover terminal information including the guest ID via the communication unit 111. Then, according to the second and the third embodiments, the server 11 sets the changeover flag on corresponding terminal information of the wireless communication terminal 32 stored in the memory unit 112 (S1408, see S601) and completes the changeover of the connection (S1409).

In contrast, if there is no changeable terminal at S1403, the terminal search unit 113, based on the terminal information stored in the memory unit 112, determines whether a new wireless communication terminal related to the inquiry about the communication changeover terminal received at S1401 is changeable or not (S1410). If changeable as a result (in cases of FIG. 11 and FIG. 12), the new wireless communication terminal is determined as the changeable terminal (S1411). According to the second and the third embodiments, furthermore, the guest ID generation unit 115 generates the guest ID of the wireless IF to be used after changeover (S1412, see S901), and the server 11 notifies the AP 21 (S1413, see S522) as well as the AP 23 as the changeover destination (S1414, see S523) of the changeover terminal information including the guest ID generated via the communication unit 111. Then, according to the second and the third embodiments, the server 11 sets the changeover flag on the corresponding terminal information of the wireless communication terminal 32 stored in the memory unit 112 (S1415, see. S601) and completes changeover of the connection (S1416). If it is determined that the new wireless communication terminal is not changeable at S1410, the server 11 rejects connection of this wireless communication terminal (S1417).

Figure 15:
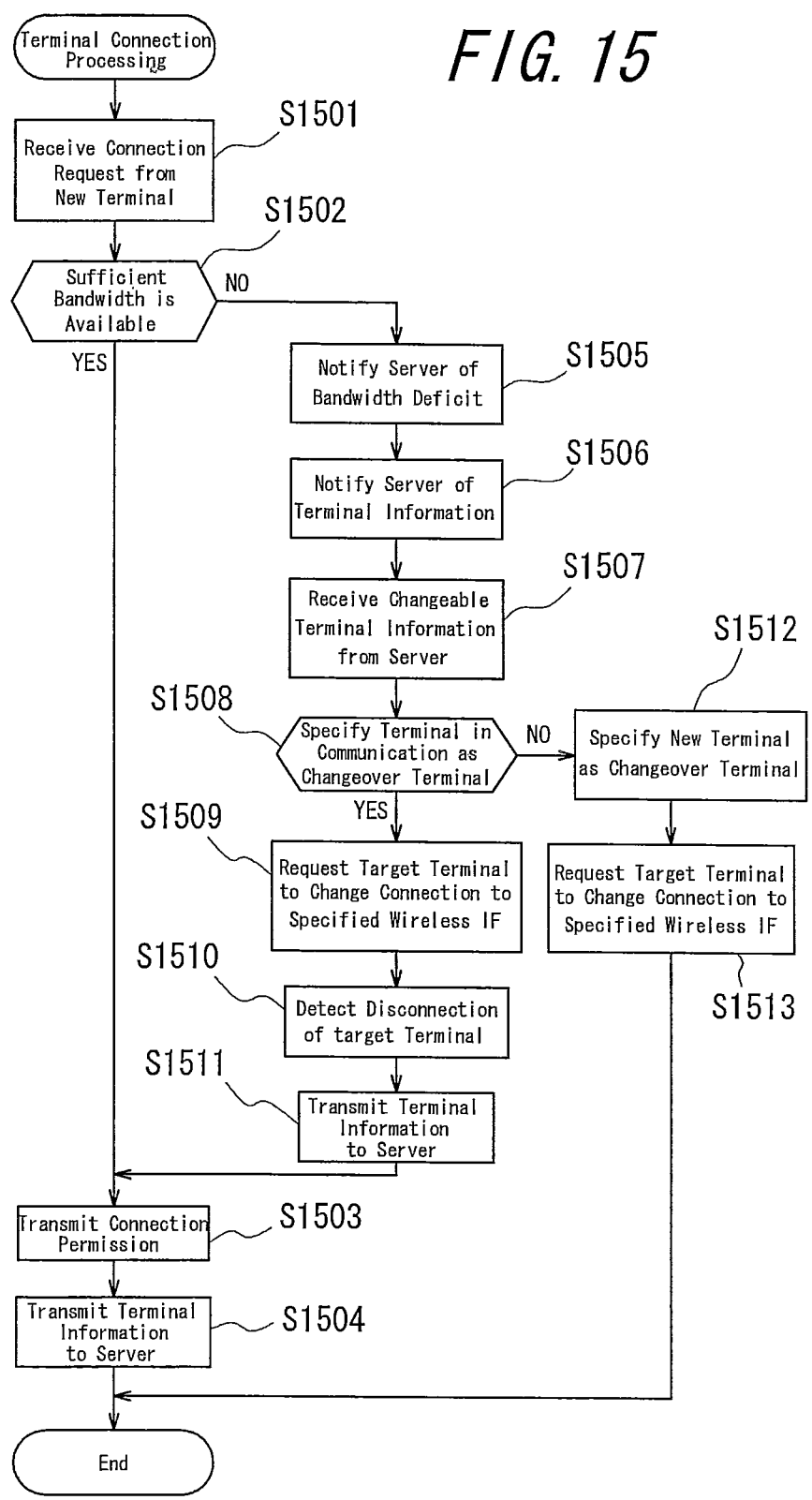
FIG. 15 is a flowchart illustrating operations of terminal connection processing by the AP shown in FIG. 1.

Next, the operations of the terminal connection processing by the AP 21 are described with reference to a flowchart shown in FIG. 15, a configuration diagram shown in FIG. 3, and sequence diagrams shown in FIG. 5, FIG. 6, FIG. 9 and FIG. 11.

When the connection request reception unit 213 receives the connection request from the new wireless communication terminal via the terminal wireless communication unit 211 (S1501, S505, S514), the bandwidth determination unit 214 of the AP 21 determines whether there is a sufficient bandwidth, that is, whether the required bandwidth for this wireless communication terminal can be secured (S1502, S508, S517). If the required bandwidth can be secured as a result, the AP 21 transmits the connection permission from the terminal wireless communication unit 211 to this wireless communication terminal (S1503, S509) and transmits the terminal information including the connection state, the bandwidth used, and other usable wireless IFs of the wireless communication terminal from the server communication unit 212 to the server 11 (S1504, S510).

In contrast, if it is determined at S1502 that the required bandwidth cannot be secured, the AP 21 notifies the server 11 of the bandwidth deficit by transmitting the inquiry about the communication changeover terminal (S1505, S518) and transmits the terminal information including the connection state of the wireless communication terminal (S1506, S519). Then, upon reception of the changeable terminal information from the server 11 (S1507), the AP 21 determines whether the wireless communication terminal already in communication is specified as the communication changeable terminal (S1508, S522 in FIG. 5, FIG. 6, FIG. 9).

If the wireless communication terminal already in communication is specified as the changeable terminal as a result, the AP 21 requests connection changeover (changeover of the wireless communication network) specified to the wireless communication terminal (S1509, see S525 in FIG. 5, FIG. 6 and FIG. 9). At this time, according to the third embodiment, the AP 21 also transmits the guest ID notified by the server 11 to the wireless communication terminal. Then, upon detecting disconnection of a target terminal (S1510, see S533), the AP 21 transmits the terminal information indicating accordingly to the server 11 (S1511, see S534) and shifts to S1503.

In contrast, if the new wireless communication terminal at S1501 instead of the wireless communication terminal already in communication is specified as the communication changeable terminal at S1508, the AP 21 (S1512, S522 in FIG. 11) requests connection changeover (changeover of the wireless communication network) specified to the new wireless communication terminal (S1513, see S525 in FIG. 11). At this time, according to the third embodiment, the AP 21 also transmits the guest ID notified by the server 11 to the new wireless communication terminal.

It is to be understood that the present invention is not limited to the above embodiments but may be modified or varied in a multiple of manners without departing from the spirit or scope of the invention.

REFERENCE SIGNS LIST

11 server
21, 22, 23 access point (AP)
31, 32, 33 wireless communication terminal
111 communication unit
112 memory unit
113 terminal search unit
115 guest ID generation unit
211 terminal wireless communication unit
212 server communication unit
213 connection request reception unit
214 bandwidth determination unit
215 changeable terminal information reception unit
311 first wireless IF
312 second wireless IF 313 wireless IF memory unit
314 connection request unit
315 control unit

The invention claimed is:

1. A base station comprising at least one processor configured to:
receive wireless interface information from a first wireless interface of a first wireless communication terminal which has the first wireless interface and a second wireless interface, wherein the wireless interface information indicates one or more wireless interfaces which include at least the second wireless interface, wherein the second wireless interface is a wireless interface by which the wireless communication terminal successfully connected to an access point;
notify a server of the wireless interface information;
notify the server of a bandwidth deficit, in response to receiving a connection request from a second wireless communication terminal, if a bandwidth for the second wireless communication terminal cannot be secured at the access point;
receive, from the server, information which indicates the first wireless communication terminal is capable of switching from the first wireless interface to the second wireless interface; and
send, to the first wireless communication terminal, an instruction to switch from the first wireless interface to the second wireless interface.

2. The base station according to claim 1, wherein the connection request received from the second wireless communication terminal includes a required bandwidth, and wherein the at least one processor:
determines whether a bandwidth fulfilling the connection request can be secured; and,
if it is determined that the bandwidth cannot be secured, notifies the server of the bandwidth deficit.

3. The base station according to claim 1, wherein the at least one processor, when instructing the first wireless communication terminal to switch from the first wireless interface to the second wireless interface, notifies the first wireless communication terminal of information necessary for connection to a wireless communication network corresponding to the second wireless interface.

4. The base station according to claim 1, wherein the at least one processor further, in response to receiving the connection request and a bandwidth necessary for establishing a connection with the wireless communication terminal from which the connection request has been received, determines the bandwidth deficit to be notified to the server.

5. A wireless communication terminal comprising:
at least two wireless interfaces including a first wireless interface and a second wireless interface;
a memory storing wireless interface information comprising usable wireless interfaces of the wireless communication terminal; and
at least one processor configured to:
connect to a second access point by the second wireless interface, modify the stored wireless interface information to include the second wireless interface as a usable wireless interface responsive to successfully connecting to the second access point,
use the first wireless interface to transmit a connection request, in a state of said first wireless interface being unconnected with the second access point, to a first access point of a first wireless communication network,
use the first wireless interface to transmit the stored wireless interface information,
receive a request from the first access point to transmit a connection request using the second wireless interface, when a bandwidth cannot be secured with the first access point, and,
in response to the request from the first access point to transmit a connection request using the second wireless interface, use the second wireless interface to transmit a connection request to the second access point of a second wireless communication network that is different from the first wireless communication network.

6. The wireless communication terminal according to claim 5, wherein the second wireless interface sends to the first access point, in addition to the connection request, a required bandwidth for the first wireless interface.

7. A server comprising:
a memory; and
at least one processor configured to,
for each of one or more wireless communication terminals,
receive wireless interface information for the wireless communication terminal from a first wireless interface of the wireless communication terminal via an access point that is communicatively connected with the wireless communication terminal, wherein the wireless interface information indicates one or more wireless interfaces which include at least a second wireless interface different from the first wireless interface, wherein the second wireless interface is a wireless interface by which the wireless communication terminal successfully connected to an access point, and
store the wireless interface information in the memory,
receive notification of a bandwidth deficit which is transmitted by a first access point based on a connection request from a wireless communication terminal,
search the wireless interface information stored in the memory to identify a wireless communication terminal that can switch from the first wireless interface to the second wireless interface, in order to make up for the bandwidth deficit, and
notify the first access point of information on the identified wireless communication terminal.

8. The server according to claim 7, wherein the wireless interface information further comprises, for each of the one or more wireless communication terminals, for each of the two or more access points, when the wireless communication terminal is currently attempting to connect to the access point, an indication that the wireless communication terminal is currently attempting to connect to the access point.

9. The server according to claim 7, wherein the at least one processor further:
stores a changeover indication for the identified wireless communication terminal in the wireless interface information stored in the memory;
receives notification that a wireless communication terminal, other than the identified wireless communication terminal, has disconnected from the first access point; and,
based on the notification and the changeover indication for the identified wireless communication terminal, notifies a second access point to which the identified wireless communication terminal is communicatively connected that the identified wireless communication terminal can be reconnected to the first access point.

10. The server according to claim 7, wherein the at least one processor further:

generates a guest identifier for the identified wireless communication terminal, wherein the guest identifier provides access, without a service contract, to a wireless communication network accessed through a second access point;

notifies the first access point of the guest identifier; and notifies the second access point of the guest identifier.

11. The server according to claim 10, wherein the at least one processor further:

stores the guest identifier in the memory; and, in response to a notification that the identified wireless communication terminal has disconnected from the second access point, clears the stored guest identifier from the memory.

* * * * *